United States Patent
Petersen et al.

(10) Patent No.: US 9,481,109 B2
(45) Date of Patent: Nov. 1, 2016

(54) BRACKET FOR CLAMPING A WIND TURBINE BLADE MOULD TO A SUPPORTING STRUCTURE

(71) Applicant: Vestas Wind Systems A/S, Aarhus N (DK)

(72) Inventors: Leif Kappel Petersen, Lem St. (DK); Paul Todd, Southampton (GB); Nathaniel Colman, Newport (GB)

(73) Assignee: Vestas Wind Systems A/S, Aarhus N. (DK)

( * ) Notice: Subject to any disclaimer, the term of this patent is extended or adjusted under 35 U.S.C. 154(b) by 205 days.

(21) Appl. No.: 14/352,949

(22) PCT Filed: Sep. 27, 2012

(86) PCT No.: PCT/DK2012/050360
§ 371 (c)(1),
(2) Date: Apr. 18, 2014

(87) PCT Pub. No.: WO2013/056715
PCT Pub. Date: Apr. 25, 2013

(65) Prior Publication Data
US 2014/0287084 A1     Sep. 25, 2014

Related U.S. Application Data

(60) Provisional application No. 61/583,666, filed on Jan. 6, 2012.

(30) Foreign Application Priority Data

Oct. 19, 2011   (GB) .................................. 1118046.0
Dec. 20, 2011   (DK) ................................ 2011 70735

(51) Int. Cl.
*B29C 33/38*     (2006.01)
*B29C 33/02*     (2006.01)
(Continued)

(52) U.S. Cl.
CPC ......... *B29C 33/202* (2013.01); *B29C 33/0011* (2013.01); *B29C 33/303* (2013.01); *B29C 33/307* (2013.01); *B29C 33/308* (2013.01); *B29L 2031/085* (2013.01); *Y02P 70/523* (2015.11)

(58) Field of Classification Search
CPC . B29C 33/202; B29C 33/307; B29C 33/303; B29C 33/0011
USPC ................... 425/179, 408, 412, 450.1, 451.9
See application file for complete search history.

(56) References Cited

U.S. PATENT DOCUMENTS 6,878,025 B2    4/2005   Mead
8,146,242 B2 *  4/2012   Prichard ............... B29C 33/307
                                                            244/123.1
(Continued)

FOREIGN PATENT DOCUMENTS

| | | |
|---|---|---|
| CN | 201597184 U | 10/2010 |
| EP | 0176385 A1 | 4/1986 |
| WO | 2010103493 A1 | 9/2010 |

OTHER PUBLICATIONS

International Bureau, Notification Concerning Transmittal of International Preliminary Report on Patentability, issued in corresponding International Application No. PCT/DK2012/050360, dated May 1, 2014, 8 pages.

(Continued)

*Primary Examiner* — Joseph S. Del Sole
*Assistant Examiner* — Thukhanh T Nguyen
(74) *Attorney, Agent, or Firm* — Wood Herron & Evans LLP

(57) ABSTRACT

A bracket is described for clamping a mould to a supporting structure. The bracket includes a first part and a second part for attaching to the mould and to the supporting structure, respectively, or vice versa. The first and second parts are connected together and configured to provide constrained relative movement along a first axis to accommodate thermal expansion of the mould relative to the supporting structure in a first direction parallel to the first axis. The first and second parts of the bracket are connected via an articulated joint that allows the first and second parts to pivot relative to one another without moving the first axis such that the bracket can independently accommodate misalignments between the mould and the supporting structure.

31 Claims, 12 Drawing Sheets

(51) Int. Cl.
  *B29C 33/20* (2006.01)
  *B29C 33/00* (2006.01)
  *B29C 33/30* (2006.01)
  *B29L 31/08* (2006.01)

(56) References Cited

U.S. PATENT DOCUMENTS 8,572,845 B2 * 11/2013 Rajasingam ............ B29C 33/26
  249/120
8,869,367 B2 * 10/2014 Yamane ................ B64F 5/0009
  29/281.1
8,951,457 B2 * 2/2015 Galdeano .............. B29C 33/306
  425/179
8,961,842 B2 * 2/2015 Sanz Pascual ........ B29C 33/308
  249/155
2009/0000726 A1 1/2009 McCowin

OTHER PUBLICATIONS

International Searching Authority, International Search Report and Written Opinion issued in corresponding PCT Application No. PCT/DK2012/050360 dated Mar. 4, 2013, 12 pages.

Danish Patent Office, Combined search and examination report issued in corresponding DK application No. PA 2011 70735 dated Aug. 1, 2012, 3 pages.

* cited by examiner

BRACKET FOR CLAMPING A WIND TURBINE BLADE MOULD TO A SUPPORTING STRUCTURE

TECHNICAL FIELD

The present invention relates generally to interface brackets of the type used to couple a wind turbine blade mould to a supporting structure such as a frame, and more specifically to an interface bracket that accommodates thermal expansion of the mould relative to the supporting structure.

BACKGROUND

Wind turbine rotor blades extend longitudinally from root to tip in a 'spanwise' direction. The blades have an airfoil profile in cross-section, which comprises longitudinally extending leading and trailing edges. A 'chordwise' direction of the blade is defined as a direction perpendicular to the spanwise direction, and which lies in a plane containing the leading and trailing edges. A 'flapwise' direction of the blade is the direction perpendicular to both the spanwise and chordwise directions.

Wind turbine rotor blades are generally formed from two shells, a windward shell and a leeward shell, which are joined together to form the complete blade. Each shell is moulded from composite materials in a respective female mould having a shape corresponding to the shape of the shell to be produced. The terms 'spanwise', 'chordwise' and 'flapwise' defined above with respect to the blade are also used hereinafter to refer to the corresponding directions with respect to the moulds. The moulds themselves are made from composite materials and are supported by respective steel frames. Interface brackets are used to connect the mould to the respective frames.

Manufacturing the blades involves laying up composite material in the respective female moulds. Once the material has been laid up in the respective moulds, the moulds are placed one on top of the other and heat and pressure is applied to the closed mould assembly to cure the composite shells. During the cure cycle, the applied heat causes the blade shells and the moulds to expand relative to the steel frames. The blade shells and the moulds have a similar coefficient of thermal expansion because they are both made from similar composite material. Consequently, the shells expand at a similar rate to the moulds. However, the shells and moulds have a significantly different thermal expansion coefficient to the steel frames, causing the shells and moulds to expand more than the steel frames.

In order to avoid distortion of a mould during a cure cycle, it is known to use interface brackets that accommodate relative movement between the mould and the supporting structure, which is caused by these differential rates of thermal expansion. Background art is discussed briefly below.

WO2011/029273A1 describes an interface device for adjusting the shape of a rotor blade mould in the chordwise direction. The device is configured to accommodate thermal expansion of the mould relative to a frame in the spanwise direction. The chordwise shape adjustment prevents the device from accommodating thermal expansion in the chordwise direction.

U.S. Pat. No. 4,398,693 describes a device for fastening a rotor blade mould to a supporting structure. The device is configured to accommodate thermal expansion of the mould relative to the supporting structure in both spanwise and chordwise directions.

WO2006070013A1 describes interface brackets for coupling a mould to a supporting structure. A plurality of brackets are arranged radially with respect to an expansion centre to accommodate spanwise and chordwise expansion of the mould relative to the supporting structure.

It is important that the mould is precisely aligned with the supporting structure in order for the interface brackets successfully to accommodate relative movement between the mould and the supporting structure. In practice, hundreds of interface brackets may be required for a wind turbine blade mould, as the blades of modern utility-scale wind turbines are very large, typically in excess of sixty meters in length. Achieving such precise alignment at each bracket is challenging and time consuming.

Against this background, the present invention aims to provide an improved interface bracket.

SUMMARY OF THE INVENTION

According to a first aspect of the present invention there is provided a bracket for clamping a wind turbine blade mould to a supporting structure, the bracket comprising a first part and a second part for attaching to the mould and to the supporting structure, respectively, or vice versa. the first and second parts being connected together and configured to provide constrained relative movement along a first axis to accommodate thermal expansion of the mould relative to the supporting structure in a first direction parallel to the first axis; wherein the first and second parts of the bracket are connected via an articulated joint that allows the first and second parts to pivot relative to one another without moving the first axis, such that the bracket can independently accommodate misalignments between the mould and the supporting structure.

The bracket of the present invention accommodates thermal expansion of a mould relative to a supporting structure and is also able to compensate for misalignments between the mould and the supporting structure.

The bracket is able to accommodate differential rates of thermal expansion between the mould and the supporting structure by virtue of the first and second parts that are able to move relative to one another. The first and second parts are constrained to move along the first axis, which prevents distortion of the mould during thermal expansion.

The articulated joint allows the bracket to compensate for misalignments between the mould and the supporting structure, which makes the bracket relatively easy to install. The articulated joint allows the first and second parts of the bracket to move relative to one another without changing the direction of the first axis of relative movement. In other words, the mechanism for compensating for misalignments is decoupled from the mechanism for compensating for thermal expansion.

Preferably the articulated joint is configured to provide relative movement between the first and second parts in three degrees of freedom. In this respect, the articulated joint may be a ball joint.

The first and second parts of the bracket may be configured to slide relative to one another in the first direction. In preferred embodiments the bracket includes a slide rod extending along the first axis. The slide rod may be fixed relative to the second part of the bracket in the first direction. The first part of the bracket preferably includes an eyelet that is slidably engaged with the slide rod to permit relative movement between the first and second parts of the bracket in the first direction.

The eyelet may be configured to pivot relative to the slide rod. The eyelet may include an outer part and an inner part, the inner part being slidably engaged with the slide rod and the outer part being configured to pivot with respect to the inner part. The inner and outer parts together may define the articulated joint. The inner part may be substantially spherical (i.e. spherical or at least partly spherical) such that the inner and outer parts effectively form a ball joint.

In certain embodiments of the present invention, the first and second parts of the bracket are further configured to provide constrained relative movement along a second axis transverse to the first axis to accommodate thermal expansion of the mould relative to the supporting structure in a second direction parallel to the second axis. In such embodiments, the articulated joint is preferably configured to allow the first and second parts of the bracket to pivot relative to one another without moving the mutually transverse first and second axes.

Preferably the slide rod is permitted to move freely relative to the second part of the bracket in the second direction to permit relative movement between the first and second parts of the bracket in the second direction. To this end, the second part of the bracket may include an elongate slot extending in the second direction in which a first end of the slide rod is slidably received. A second end of the slide rod may be fixed relative to the second part of the bracket in the second direction. This arrangement may substantially prevent relative movement in the second direction when the eyelet is located towards the second end of the rod. In other embodiments, both ends of the slide rod may be slidably received in respective opposed slots.

An elongate member, also referred to herein as a 'parallel key' may be provided at one or both ends of the rod. The or each elongate member may be received in a respective slot. The extent of relative movement permitted between the first and second parts of the bracket in the second direction is determined by the amount of clearance in the second direction between the or each elongate member and the respective slot. Relative movement in the second direction is facilitated by having an elongate member that is shorter than its respective slot. Conversely, the rod may be fixed at one end by having an elongate member at that end which is the same length as its respective slot. Of course, for embodiments in which the rod is fixed at one end, the fixed end may not include an elongate member and may instead be bolted, welded or otherwise fixed to the second part of the bracket.

For embodiments having an elongate member at both ends of the rod, the elongate members may be substantially the same length and the slots may have different lengths. For example one slot may be the same length as the elongate members and the other slot may be longer such the rod is fixed at one end whilst the other end of the rod is moveable in the second direction. Alternatively the elongate members may have different lengths and the slots may have substantially the same length. For example, one elongate member may be the same length as the slots and the other elongate member may be shorter so that the rod is fixed at one end and slidable in the respective slot at the other end. In other embodiments, both elongate members may be slidable in the respective slots.

The second part of the bracket may comprise a U-shaped mount. The U-shaped mount may have a substantially flat base and a pair of opposed sidewalls. The or each slot may be provided in a respective sidewall of the U-shaped mount.

The bracket is preferably adjustable in a third direction perpendicular to the mutually transverse first and second axes. This adjustment may vary the separation between the first and second parts in the third direction. Alternatively the adjustment may cause the first and second parts to move together in the third direction relative to the mould and supporting structure.

The mutually transverse first and second axes are preferably mutually perpendicular. In preferred examples of the invention, the mould is a mould for part of a wind turbine blade, for example a blade shell. The first and second axes are preferably substantially parallel to the spanwise and chordwise directions of the mould respectively. The third direction is preferably substantially parallel to the flapwise direction of the mould.

According to the present invention, there is also provided a mould assembly comprising a mould coupled to a supporting structure by a plurality of brackets as described above.

As mentioned above, the mould is preferably for moulding part of a wind turbine rotor blade, for example the blade shell. The brackets are preferably arranged to accommodate thermal expansion of the mould relative to the supporting structure in mutually perpendicular spanwise and chordwise directions of the mould.

A first set of brackets may be arranged respectively at intervals along a leading edge of the mould. A second set of brackets may be arranged respectively at intervals along a trailing edge of the mould. The first and second sets of brackets may be configured to accommodate different extents of thermal expansion of the mould in the chordwise direction. Preferably the brackets at the trailing edge are configured to accommodate greater chordwise thermal expansion than the brackets at the leading edge.

The mould may include a plurality of air ducts through which warm air is channeled to heat the moulds. The respective brackets are preferably attached to these air ducts.

The inventive concept includes a wind turbine blade mould assembly comprising a mould coupled to a supporting structure by a plurality of brackets as described above.

According to a second aspect of the present invention there is provided a bracket for clamping a wind turbine blade mould to a supporting structure, the bracket comprising a first part and a second part for attaching to the mould and the supporting structure, respectively, or vice versa, the first and second parts being connected together and configured to provide constrained relative movement between the mould and the supporting structure to accommodate thermal expansion of the mould relative to the supporting structure in a spanwise direction and/or in a chordwise direction; wherein the bracket is adjustable in a generally flapwise direction substantially perpendicular to both the spanwise and chordwise directions to vary the separation between the mould and the supporting structure in the flapwise direction.

Once the brackets are clamped between the mould and the supporting structure, the flapwise adjustment enables the brackets to be used to change the shape of the mould slightly.

As described above, the first and second parts of the bracket may be connected via an articulated joint that allows the first and second parts to pivot relative to one another, such that the bracket can independently accommodate misalignments between the mould and the supporting structure.

Optional features described above and/or claimed in respect to the bracket of the first aspect of the present invention are equally applicable to the bracket of the second aspect of the invention but are not repeated herein in order to avoid repetition.

BRIEF DESCRIPTION OF THE DRAWINGS

In order that the present invention may be more readily understood, embodiments of the invention will now be described in detail, by way of example only, with reference to the following figures, in which:

FIGS. 8A-8D illustrate schematically how the interface brackets accommodate relative movement between the mould and the frame when the mould is heated, wherein:

FIG. 8A is a side view of an interface bracket in a neutral position before the mould is heated;

FIG. 8B is an end view of the interface bracket in the neutral position, as viewed in the direction of arrow 95 in FIG. 8A;

FIG. 8C is a side view of the interface bracket after the mould has been heated, in which the interface bracket has accommodated longitudinal expansion of the mould relative to the frame; and FIG. 8D is an end view of the interface bracket after the mould has been heated, as viewed in the direction of arrow 96 in FIG. 8C, in which the interface bracket has accommodated chordwise expansion of the mould relative to the frame;

DETAILED DESCRIPTION

Figure 1:
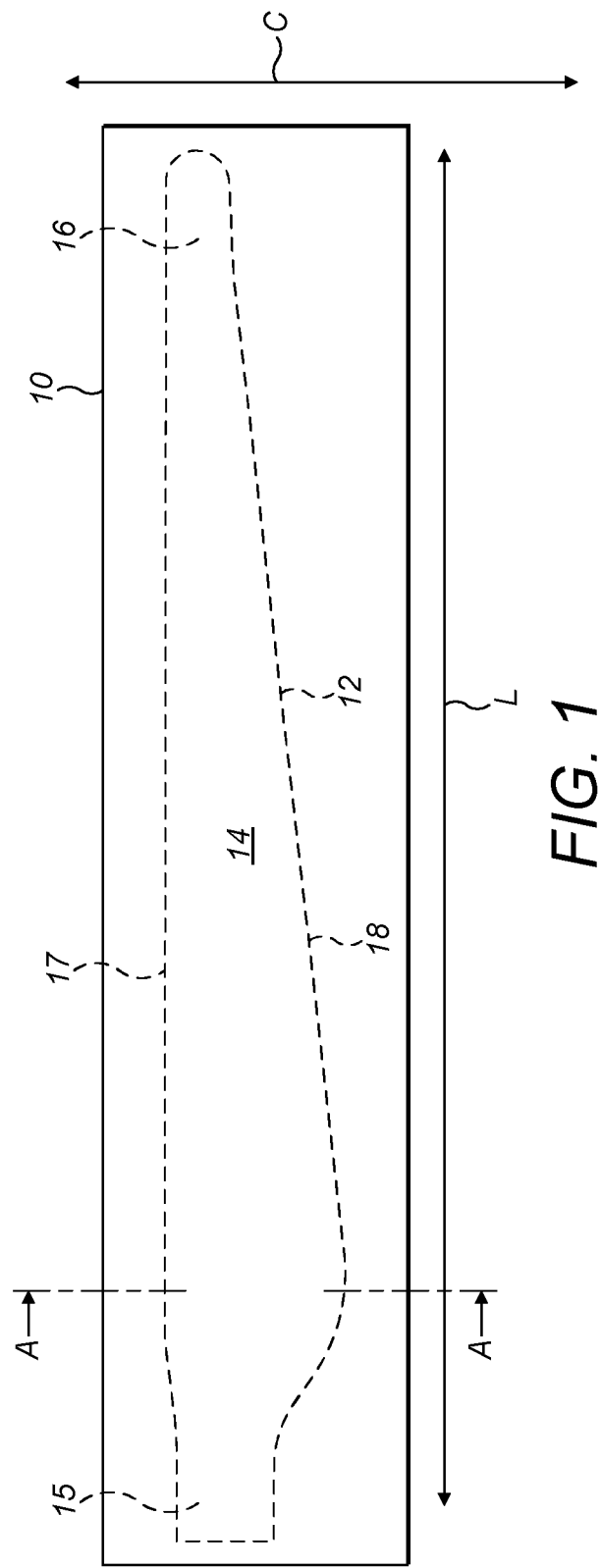
FIG. 1 is a plan view of a windward mould for a windward shell of a wind turbine blade, with the arrows L and C respectively indicating longitudinal and chordwise directions of the mould.

FIG. 1 is a plan view of an elongate female mould 10, which is used to form the windward shell of a wind turbine rotor blade. The dashed outline 12 in FIG. 1 represents the general shape of the wind turbine blade, with the area inside the dashed line representing the female mould surface 14. The mould surface 14 extends in a longitudinal direction L from a root portion 15 to a tip portion 16, and in a chordwise direction C between a leading edge 17 and a trailing edge 18. The longitudinal and chordwise directions L, C are mutually perpendicular.

Figure 2:
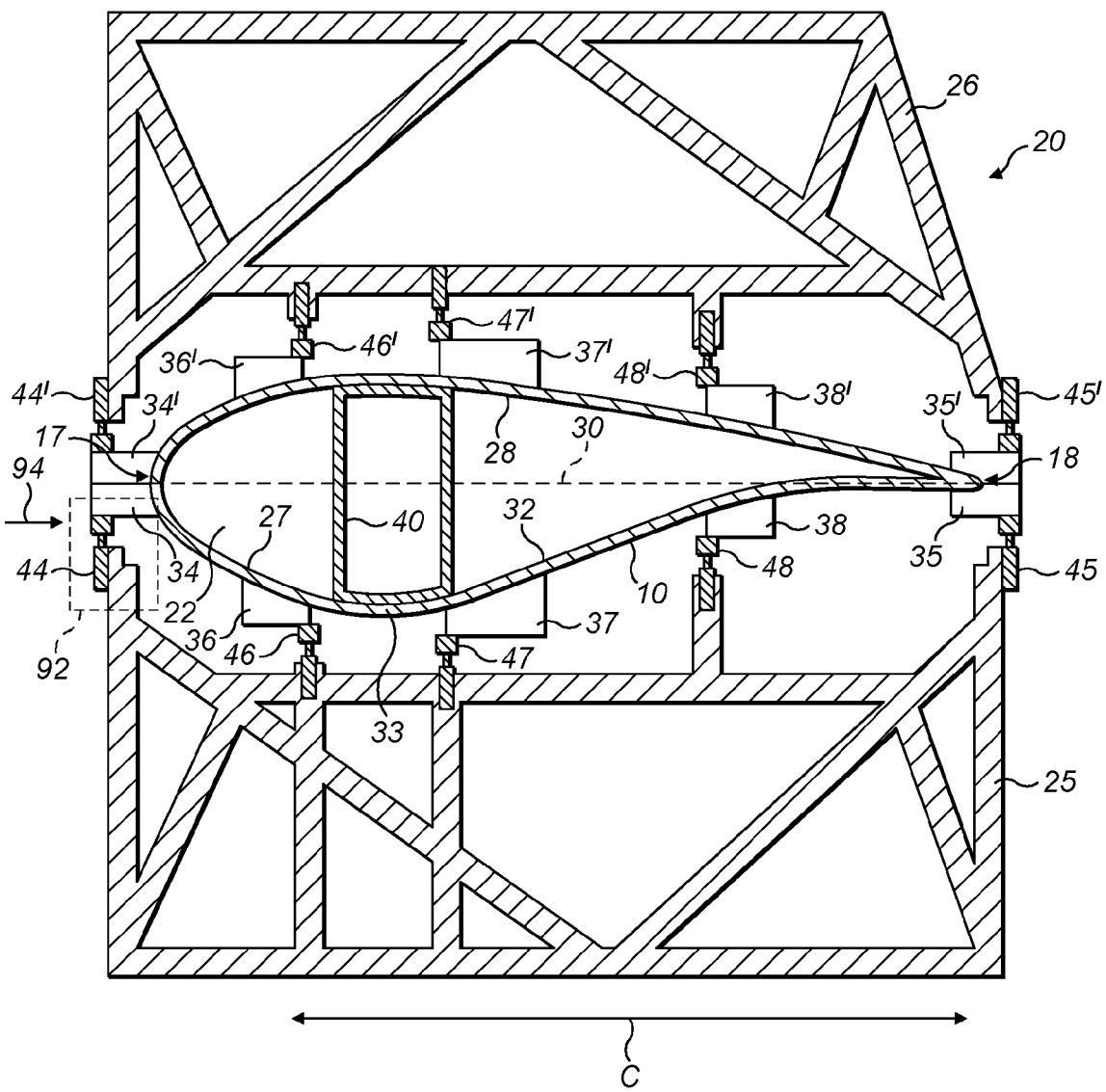
FIG. 2 is a cross-section through the windward mould taken along the line A-A in FIG. 1, in which a leeward mould is arranged on top of the windward mould, with each mould being coupled to a respective supporting frame by a plurality of interface brackets.

FIG. 2 shows a cross-section of a mould assembly 20 for manufacturing a rotor blade 22 of a wind turbine. The mould assembly 20 includes the windward mould 10 of FIG. 1, as viewed in cross-section in the direction of arrows A-A in FIG. 1, and a leeward mould 24. The windward mould 10 is supported by a windward frame 25, whilst the leeward mould 24 is supported by a leeward frame 26. The frames 25, 26 are each made from steel. The mould assembly 10 is shown in a closed configuration in FIG. 2, with the leeward mould 24 and frame 26 being arranged on top of the windward mould 10 and frame 25.

A windward shell 27 of the blade 22 is moulded in the windward mould 10 and a leeward shell 28 is moulded in the leeward mould 24. The blade shells 27, 28 are formed from glass-fibre reinforced composite material (GRP). The straight dashed line 30 in FIG. 1, which extends between the leading edge 17 of the blade 22 and the trailing edge 18 of the blade 22, is commonly referred to as a 'chord line'. The double-headed arrow C in FIG. 1 represents the chordwise direction.

The moulds 10, 24 are each made from composite material and comprise a smooth skin 32, which forms the mould surface 14 (see FIG. 2). The skin 32 is backed by a honeycomb core 33, to which a plurality of air ducts 34-38 are attached. The air ducts 34-38 are formed from elongate boxes that extend in the longitudinal direction L (see FIG. 1), i.e. perpendicular to the plane of FIG. 2.

As shown in FIG. 2, each mould 10, 24 includes five air ducts 34-38. Considering just the windward mould 10, a first air duct 34 is located at the leading edge 17 of the mould 10, a second air duct 35 is located at the trailing edge 18 of the mould 10, third and fourth air ducts 36, 37 are located on either side of a spar structure 40 of the blade 22, and a fifth air duct 38 is positioned approximately midway between the spar structure 40 and the trailing edge 18.

The leeward mould 24 has a corresponding arrangement of air ducts 34'-38' such that when the mould assembly 20 is closed, as shown in FIG. 2, the air ducts 34-38, 34'-38' of the respective moulds 10, 24 are located substantially opposite one another. Curing the blade shells 27, 28 involves blowing warm air through the ducts 34-38, 34'-38'. The warm air diffuses through the honeycomb cores 33 of the respective moulds 10, 24 and warms the mould skins 32.

The moulds 10, 24 are coupled to the respective frames 25, 26 via a plurality of interface brackets 44-48, 44'-48'. The interface brackets 44-48, 44'-48' are each welded to the frames 25, 26 and bolted to a respective air duct 34-38, 34'-38' of the respective moulds 10, 24. Considering just the windward mould 10 and the windward frame 25, a first interface bracket 44 is located at the leading edge 17 and couples the frame 25 to the first air duct 34; a second interface bracket 45 is located at the trailing edge 18 and couples the frame 25 to the second air duct 35; and three intermediate interface brackets 46, 47, 48 are provided which couple the frame 25 respectively to the third, fourth and fifth air ducts 36, 37, 38. A corresponding set of interface brackets 44'-48' is used to couple the leeward frame 26 to the respective air ducts 34-38 of the leeward mould 24. The interface brackets 44-48, 44'-48' will now be described in more detail with reference to FIGS. 3 to 5.

Figure 3:
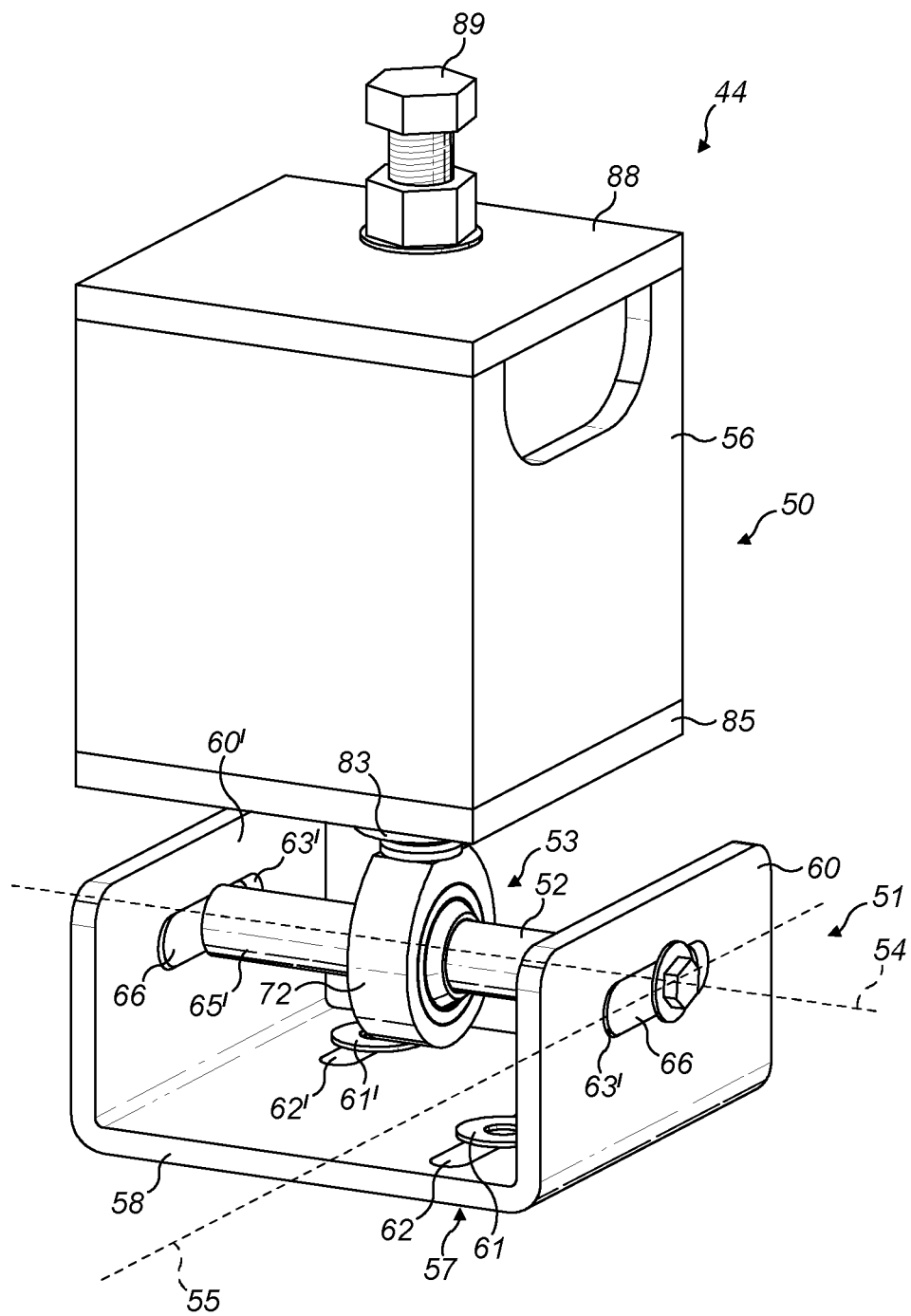
FIG. 3 is a perspective view of an interface bracket according to a first embodiment of the present invention.

Referring to the perspective view of FIG. 3, an interface bracket 44 according a first embodiment of the present invention generally comprises a first part 50 and a second part 51, which are moveable relative to one another via a slide rod 52 and eye bearing assembly 53, along first and second mutually perpendicular axes as represented by the respective dashed lines 54 and 55. The bracket 44 is mounted to the mould 10 and frame 25 (see FIG. 2) such that the first axis 54 is aligned with the longitudinal direction L (see FIG. 1) and the second axis 55 is aligned with the chordwise direction C (see FIG. 1). The mechanism for providing this relative movement is described in more detail later, following a discussion of the component parts of the bracket 44.

The first part 50 of the bracket 44 comprises a box-shaped housing 56, which attaches to the frame 25 of the mould assembly 20 shown in FIG. 2. The second part 51 of the bracket 44 comprises a U-shaped mount 57, which has a flat base 58 and a pair of opposed sidewalls 60, 60'. The U-shaped mount 57 attaches to an air duct 34 of the mould 10 (see FIG. 2) via a pair of bolts 61, 61', which extend through respective slots 62, 62' provided in the base 58 of the U-shaped mount 57.

Figure 4:
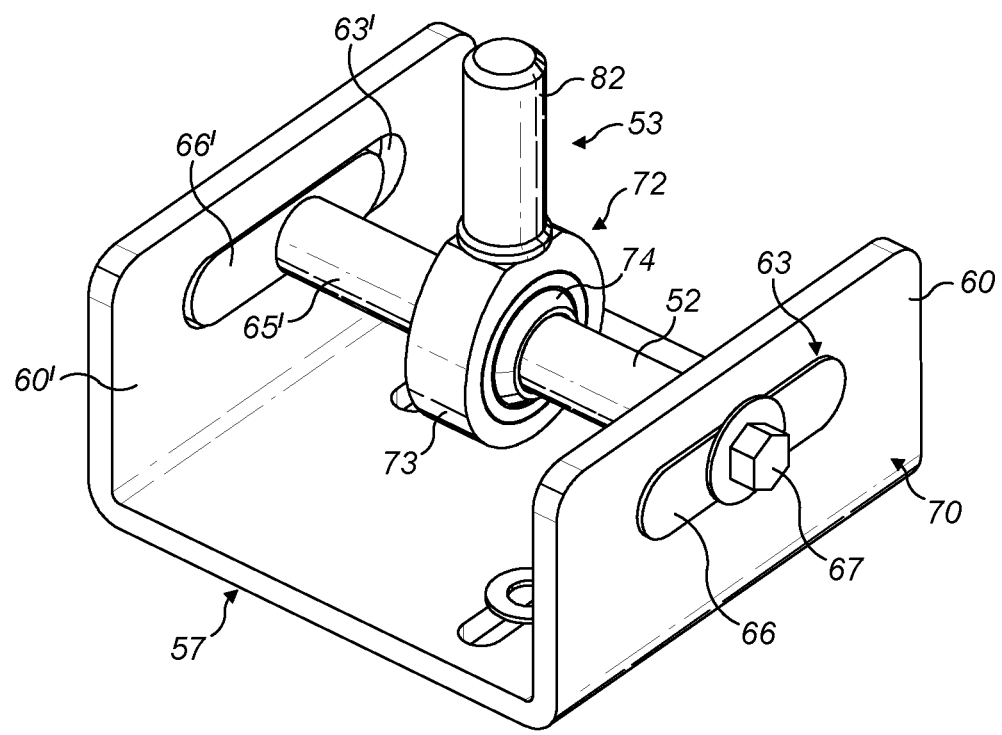
FIG. 4 is an enlarged perspective view of a lower part of the interface bracket of FIG. 3.

As best seen in FIG. 4, first and second elongate slots 63, 63' are provided in the respective sidewalls 60, 60' of the U-shaped mount 57. the first slot 63 is shorter than the second slot 63'. The slide rod 52 extends between the slots 63, 63' in a direction substantially perpendicular to the direction of extension of the slots 63, 63'. A first end 65 (see FIG. 5A) of the slide rod 52 includes a first elongate portion 66 (see FIG. 3) and a second end 65' of the slide rod 52 includes a second identical elongate portion 66'. The elongate portions 66, 66', which are referred to hereafter as 'parallel keys', are received in the respective slots 63, 63'. The parallel keys 66, 66' are each substantially the same shape and size as the shorter first slot 63. Consequently, the first parallel key 66 is prevented from moving within the first slot 63, whilst the second parallel key 66' is able to slide within the second slot 63' in a direction perpendicular to the direction of extension of the slide rod 52.

Figure 5A:
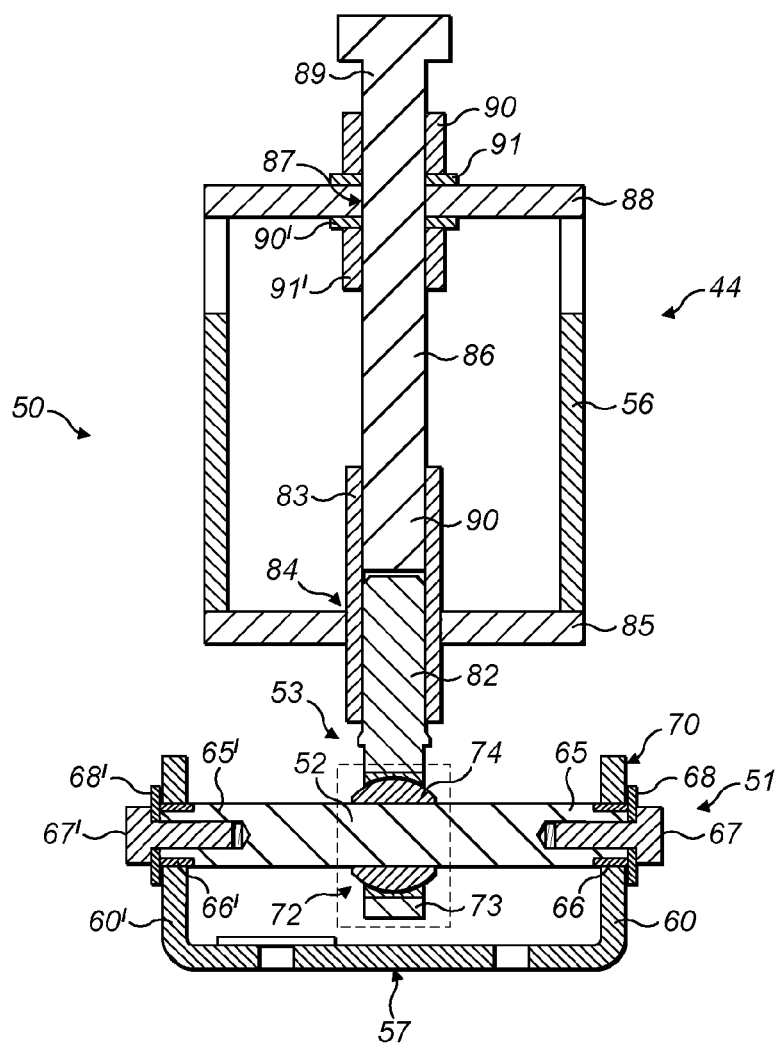
FIG. 5A is a cross-sectional view of the interface bracket of FIG. 3.

As best seen in FIG. 5A, the parallel keys 66, 66' are retained in the slots 63, 63' by a pair of bolts 67, 67' and a pair of washers 68, 68'. The bolts 67, 67' are provided axially in the respective ends 65, 65' of the slide rod 52 and the washers 68, 68' are provided between the respective bolts 67, 67' and the respective ends 65, 65' of the slide rod 52 on an outer side 70 of the respective sidewalls 60, 60' of the U-shaped mount 57. Referring to FIG. 3, the washers 68, 68' are suitably larger than the slots 63, 63' to prevent axial movement of the slide rod 52 relative to the U-shaped mount 57 along the first axis 54, thereby serving to retain the parallel keys 66, 66' in the respective slots 63, 63'. The first bolt 67 is loosely tightened to allow some 'play' between the first end 65 of the slide rod 52 and the first parallel key 66, i.e. so that the slide rod 52 can pivot relative to the U-shaped mount 57.

The first part 50 of the bracket 44 includes the eye bearing assembly 53, which includes an eyelet 72 that is slidably coupled to the slide rod 52. Referring to FIGS. 4 and 5A, the eyelet 72 comprises an annular outer portion 73, which surrounds a substantially spherical inner portion 74. The spherical inner portion 74 includes a through bore 75 through which the slide rod 52 extends such that the eyelet 72 and slide rod 52 are slidably engaged.

Figure 5B:
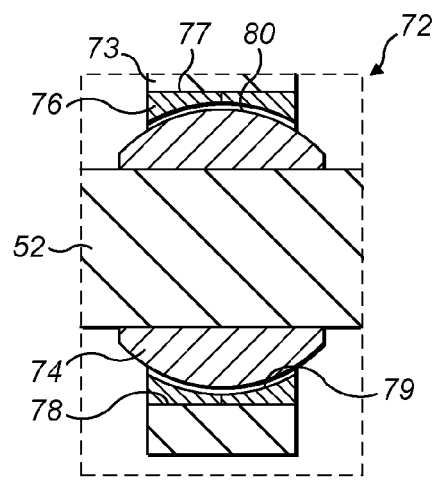
FIG. 5B is an enlarged view of the part of the interface bracket within the dashed box of FIG. 5A.

As seen best in the enlarged cross-sectional view of FIG. 5B, the eyelet 72 further includes an intermediate portion 76, which is provided between the spherical inner portion 74 and the annular outer portion 73. The intermediate portion 76 has a cylindrical outer surface 77 complementary to a cylindrical inner surface 78 of the annular portion 73, and a curved inner surface 79 complementary to a curved outer surface 80 of the spherical inner portion 74. The intermediate portion 76 is fixed to the outer annular portion 73 whilst the inner surface 79 of the intermediate portion 76 is configured to slide over the curved surface 80 of the spherical portion 74.

The eye bearing assembly 53 provides an articulated joint between the first and second parts 50, 51 of the bracket 44 that enables these parts to pivot relative to one another. The articulated joint in this example is effectively a ball joint and provides relative movement between the first and second parts 50, 51 in three rotational degrees of freedom.

Referring to FIG. 5A, the annular outer portion 73 of the eye bearing 53 is provided at one end of a threaded shaft 82, such that the shaft 82 extends substantially perpendicular to the slide rod 52. The other end of the shaft 82 is received inside a tubular bushing 83, which is inserted in an aperture 84 in a bottom plate 85 of the housing 56 of the first part 50 of the bracket 44. A threaded bolt 86 extends into the box-shaped housing 56 through an aperture 87 provided in a top plate 88 of the housing 56. A first end 89 of the bolt 86 is located outside the housing 56 and a second end 90 of the bolt 86 is located inside the housing 56. The tubular bushing 83 connects the second end 90 of the bolt 86 coaxially to the threaded shaft 82 of the eye bearing assembly 53.

The bolt 86 is clamped to the top plate 88 of the housing 56 via a pair of nuts 90, 90' and washers 91, 91' arranged on opposite sides of the top plate 88. Once the interface bracket 44 has been mounted to the mould 10 and to the frame 25 (FIG. 2), the first and second parts 50, 51 of the bracket 44 may be adjusted vertically (in the flapwise direction) by loosening the pair of nuts 90, 90' at the top plate 88 and turning both nuts 90, 90' so that the bolt 86 is pushed up or down. This causes the first and second parts 50, 51 of the bracket to move towards or away from one another.

In an alternative embodiment (not shown) vertical adjustment may instead be provided by moving both the first and second parts 50, 51 of the bracket together relative to the mould 10 or the frame 25. For example, rather than fixing the housing 56 to the frame 25, the bolt 89 may be attached to the frame 25, and hence turning both nuts 90, 90' causes both the first and second parts 50, 51 of the bracket to move together to provide a vertical adjustment.

Figure 6:
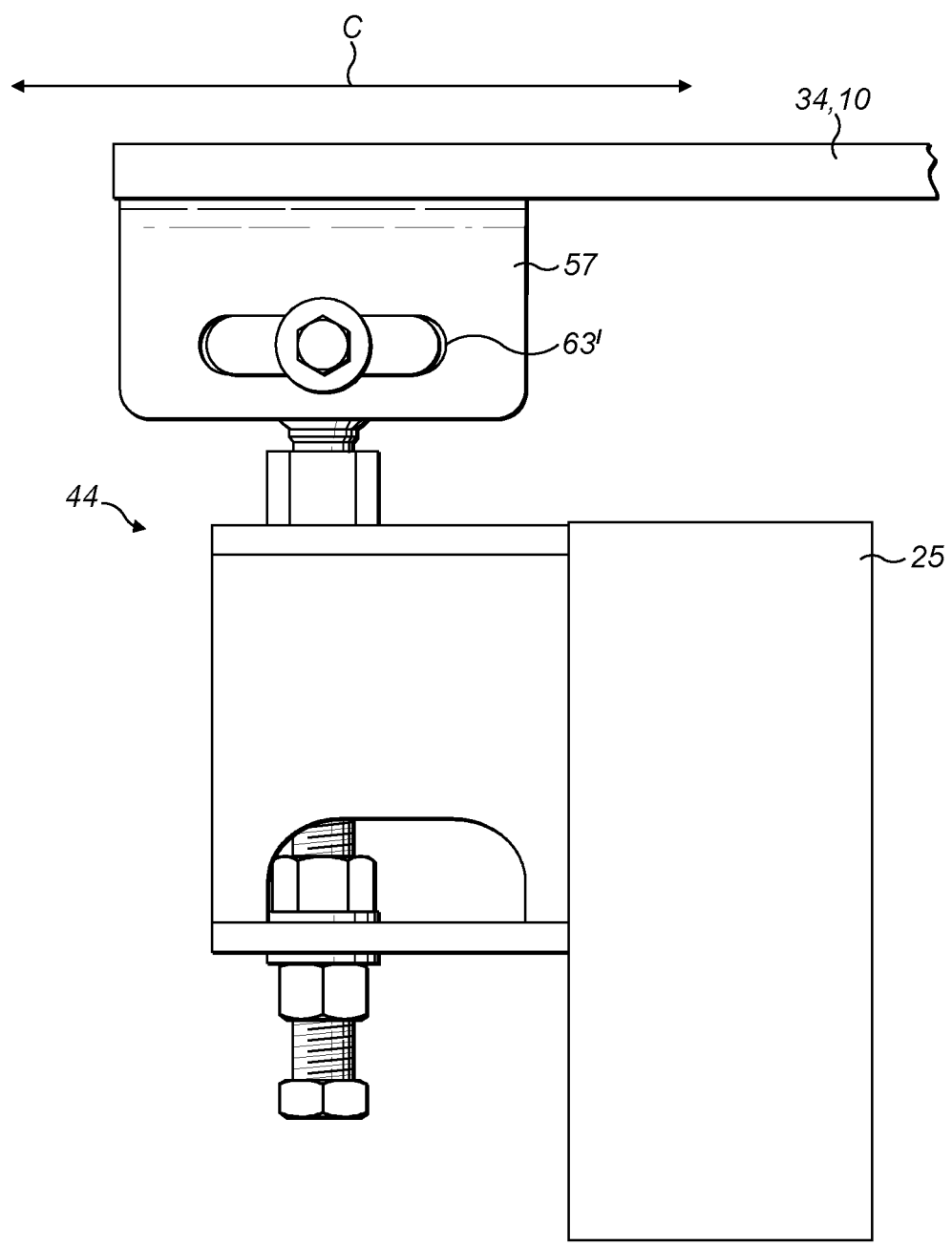
FIG. 6 is an enlarged view of the part of FIG. 2 within the dashed box, i.e. showing an interface bracket located at a leading edge of the windward mould.

Referring to FIG. 6, which is an enlarged view of the part of FIG. 2 within the dashed box 92, i.e. showing a leading-edge bracket 44, the U-shaped mount 57 is bolted to the first air duct 34 of the windward mould 10 and the box-shaped housing 56 is welded to the steel windward frame 25. The U-shaped mount 57 is arranged such that the elongate slot 63' extends in the chordwise direction C of the mould 10.

Figure 7:
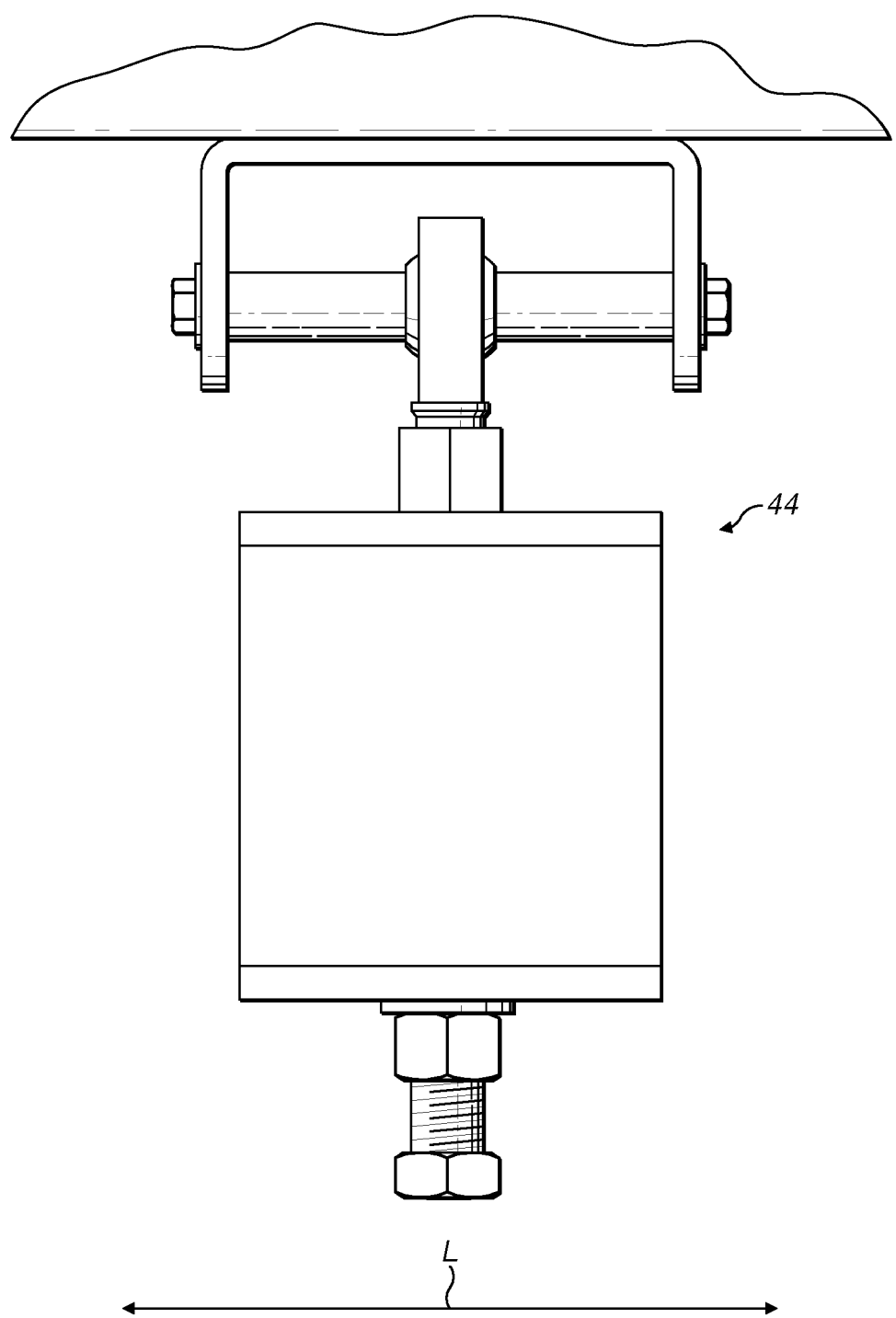
FIG. 7 is a side view of the bracket shown in FIG. 6, as viewed in the direction of the arrow 94 in FIG. 2.

Referring to FIG. 7, which is a side view of the leading-edge bracket 44 as viewed in the direction of the arrow 94 in FIG. 2, the slide rod 52, which is fixed perpendicular to the slots 63, 63' (FIG. 3), extends in the longitudinal direction L. The other interface brackets are mounted in the same way, i.e. with their slots 63, 63' extending in the chordwise direction C and their slide rods 52 oriented in the longitudinal direction L.

As mentioned previously, warm air is blown through the air ducts 34-38, 34'-38' of the moulds 10, 24 to cure the blade shells 27, 28 (see FIG. 2). The warm air causes both the moulds 10, 24 and the frames 25, 26 to expand. However, due to the different coefficients of thermal expansion between the moulds 10, 24 and the frames 25, 26, the moulds 10, 24 expand significantly more than the frames 25, 26. The interface brackets 44-48, 44'-48' allow the moulds 10, 24 to move slightly relative to the steel frames 25, 26 in order to accommodate this differential thermal expansion and hence to prevent the moulds 10, 24 from distorting, as will now be explained with reference to FIGS. 8A to 8D.

Figure 8A:
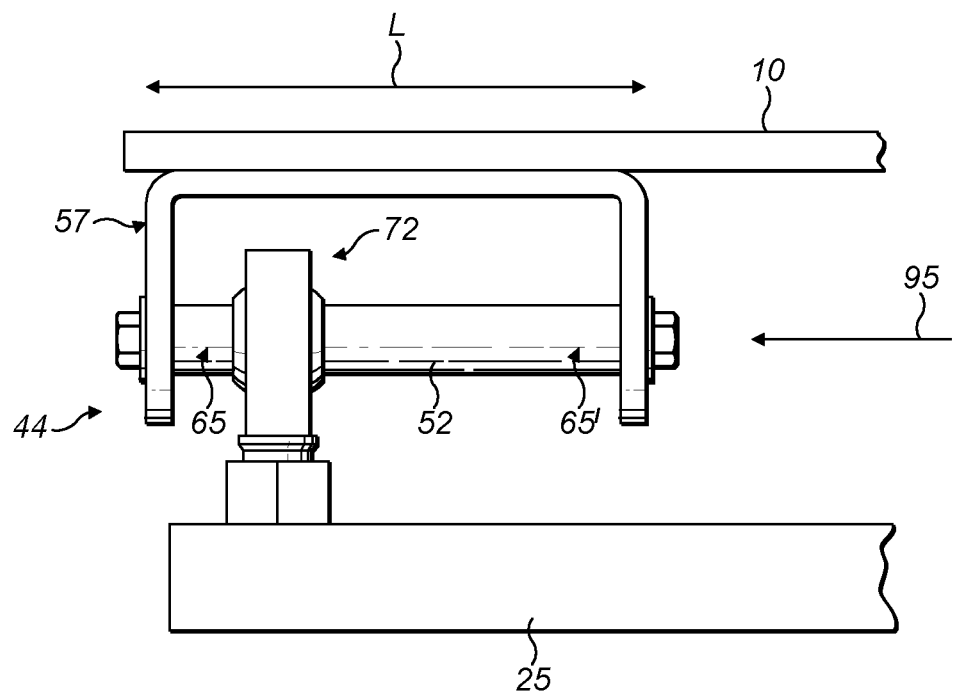
Figure 8B:
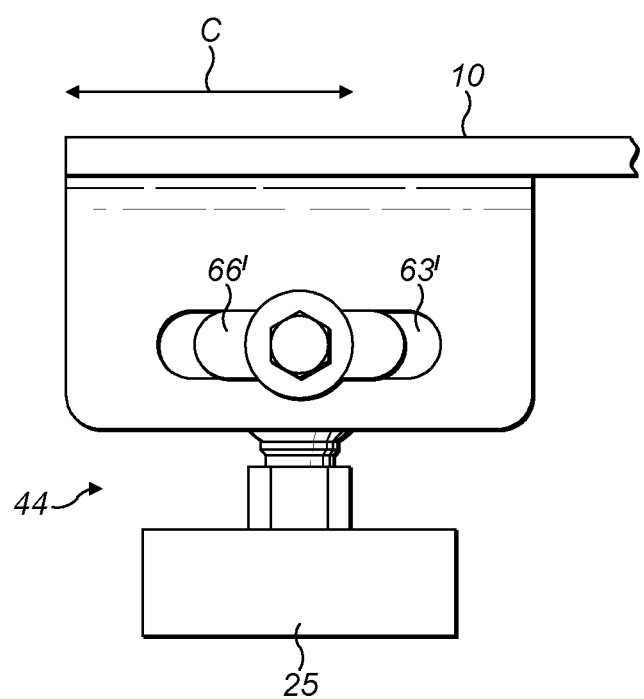
Figure 8C:
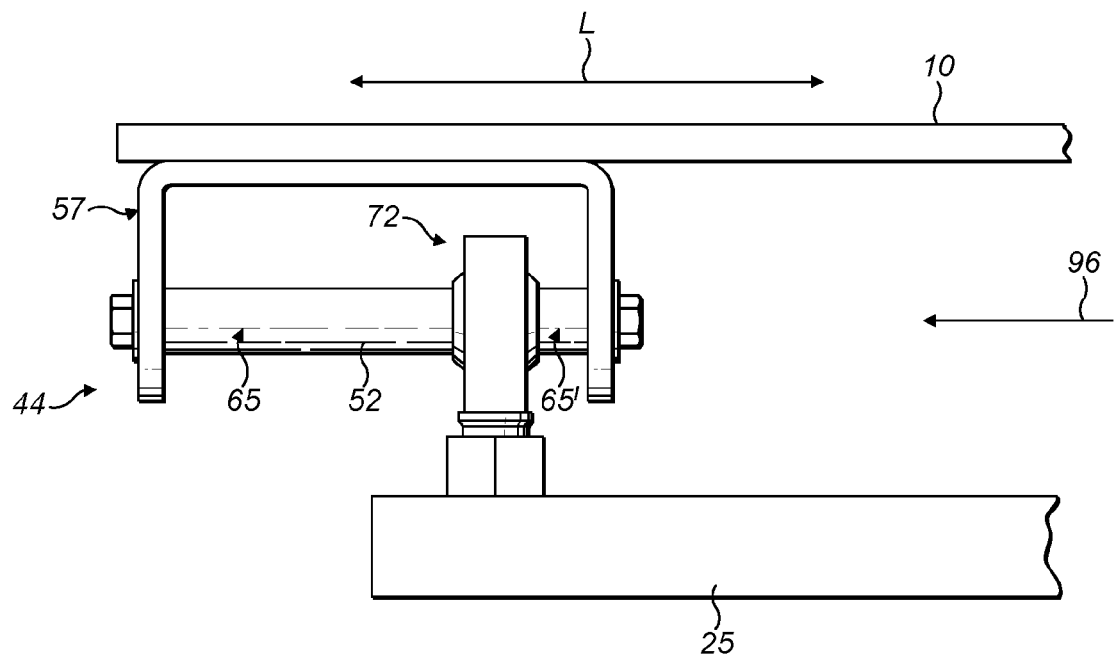
Figure 8D:
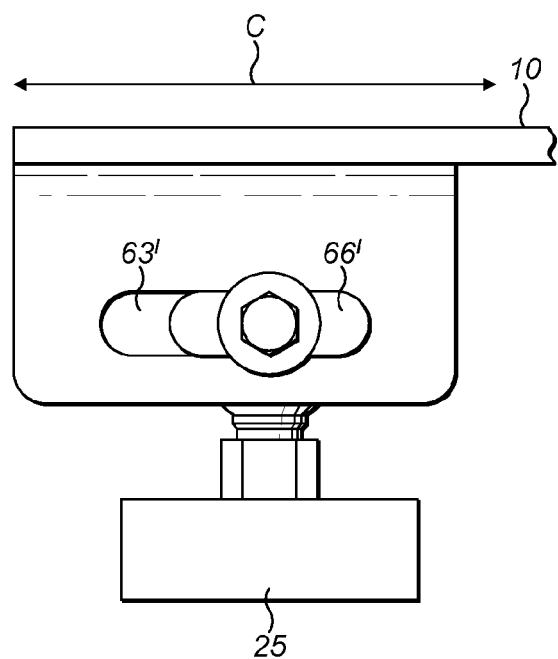

FIGS. 8A and 8B show the interface bracket 44 in a neutral or 'cold' position when the mould 10 is cold, i.e. before heat is applied to the mould 10, whilst FIGS. 8C and 8D show the position of the interface bracket 44 in a 'hot' position after the mould 10 has been heated. The mould 10 and frame 25 are represented schematically in FIGS. 8A to 8D, and the box-shaped housing 56 has been omitted to simplify these views. FIGS. 8A and 8C are side views of the bracket 44, showing the longitudinal direction L, whilst FIGS. 8B and 8D are end views of the bracket 44 as viewed in the direction of the respective arrows 95, 96 in FIGS. 8A and 8C, and showing the chordwise direction C.

Referring first to the side view of FIG. 8A, in the neutral position the eyelet 72 is located towards the first end 65 of the slide rod 52, and hence near the first, relatively short slot 63 of the U-mount 57 (see FIG. 4). As described above, the first parallel key 66 is the same size as the first slot 63 and hence the first end 65 of the slide rod 52 is prevented from sliding in the first slot 63 in the chordwise direction. However, as mentioned above, the loosely tightened bolt 67 at the first end 65 of the slide rod 52 allows the slide rod to pivot at the first end relative to the U-mount 57.

Referring to the end view of FIG. 8B, the second parallel key 66' at the second end 65' of the slide rod 52 is located in a neutral position in the second slot 63', such that there is approximately 2 mm clearance between each end of the parallel key 66' and the slot 63' in the chordwise direction C.

Once heat is applied to the mould 10, the mould 10 expands relative to the frame 25. FIGS. 8C and 8D show the expanded mould 10 with the interface bracket 44 in a 'hot' position. Referring to FIG. 8C, as the mould 10 expands, the U-mount 57 and slide rod 52 move together with the mould 10 in the longitudinal direction L because the U-mount 57 is bolted to the mould 10 and the slide rod 52 is fixed in the longitudinal direction L to the U-mount 57. The slide rod 52 slides through the eyelet 72, which is mounted to the frame 25, such that the eyelet 72 ends up being located towards the second end 65' of the slide rod 52, i.e. close to the relatively long second slot 63' in the U-mount 57 (FIG. 8D).

Referring to FIG. 8D, by virtue of the slots 63, 63', the U-mount 57 is free to move in the chordwise direction C relative to the slide rod 52 as the mould 10 expands. The extent of relative movement permitted is determined by the clearance between the second parallel key 66' and the relatively long slot 63', which in this example is +/−2 mm. Movement in the chordwise direction is also facilitated by the ability of the slide rod 52 to pivot at the first end, as described above. As shown in FIG. 8D, the mould 10 has expanded by approximately 2 mm in the chordwise direction C such that the slide rod 52 and second parallel key 66' have ended up towards one end of the second slot 63'.

The configuration of slots 63, 63' and parallel keys 66, 66' in this embodiment means that relative chordwise sliding between the mould 10 and the frame 25 is restricted in the cold condition and progressively allowed as the mould 10 expands longitudinally. The mould 10 is therefore advantageously rigid in the cold condition, yet free to expand in the chordwise direction when heated.

Referring again to FIG. 2, the various interface brackets 44-48, 44'-48' in this example are configured to permit different amounts of relative chordwise movement between the moulds 10, 24 and the respective frames 25, 26. In particular, the brackets 44, 44' at the leading edge 17 are configured to allow relative movement of +/−2 mm in the chordwise direction C, whilst the brackets 45, 45' at the trailing edge 18 and the intermediate brackets 46-48, 46'-48' are configured to allow relative chordwise movement of +/−10 mm. To this end, the second slot 63' of the respective trailing edge brackets 45, 45' and intermediate brackets 46-48, 46'-48' is 16 mm longer than the second slot 63' of the respective leading edge brackets 44, 44'. In other embodiments, only the intermediate and trailing edge brackets may permit chordwise movement, with the leading edge brackets being completely restrained in the chordwise direction.

In other embodiments of the invention, the second slots 63' of the various brackets 44-48, 44'-48' may all be the same length, and the second parallel keys 66' of the various brackets 44-48, 44'-48' may have different lengths. This would allow a universal U-mount 57 to be used across all brackets 44-48, 44'-48'. It will be appreciated that the slide rod/parallel key assembly 52, 66, 66' in the present embodiment is universal across the various brackets 44-48, 44'-48'. In other variants of the invention, clearance may be provided between the first slot 63 and the first parallel key 66 such that chordwise movement is permitted in the 'cold' position of the brackets 44-48, 44'-48'.

It will be apparent that the amount of movement permitted in the longitudinal direction L is determined by the length of the slide rod 52 and the dimensions of the eyelet 72. In this example the slide rod 52 is approximately 80 mm in length and the permitted lengthwise displacement is 60 mm.

Since the U-mount 57 is rigidly mounted to the mould 10, 24 with the slots 63, 63' aligned with the chordwise direction C and the slide rod 52 aligned in the longitudinal direction L, the mould 10, 24 is constrained to move only in those two mutually orthogonal directions, which ensures that the geometry of the mould 10, 24 is preserved during thermal expansion.

It will be appreciated that the accommodation of longitudinal expansion is decoupled from the accommodation of chordwise expansion. Different amounts of longitudinal expansion can be accommodated by varying the length of the slide rod 52, whilst different amounts of chordwise expansion can be accommodated by varying the relative sizes of the slots 63, 63' and parallel keys 66, 66' for example. The design of the interface brackets 44-48, 44'-48' allows these parameters to be optimised independently.

Any misalignment between the moulds 10, 24 and the respective frames 25, 26 may be compensated for by the articulated joint provided by the eye-bearing assembly 53. The articulated joint allows the U-shaped mount 57 of the second part 51 of the bracket to move in three rotational degrees of freedom relative to the box-shaped housing 50 of the second part 50 of the bracket. It will be appreciated that this mechanism is entirely decoupled from the mechanisms for accommodating thermal expansion described above because the articulated joint does not affect the alignment of the slots 63, 63' and slide rod 52 with respect to the mould 10, 24.

In practice, several hundred interface brackets are used to coupled the moulds 10, 24 to the respective frames 25, 26, and the articulated joint greatly facilitates mounting the brackets because slight misalignments between the moulds 10, 24 and the frames 25, 26 are readily accommodated.

Alternative embodiments of the invention are envisaged in which both ends 65, 65' of the rod 52 may be moveable within the respective slots 63, 63'. In this respect, both parallel keys 66, 66' may be suitably shorter than their respective slots 63, 63'. In other examples, the ends 65, 65' of the rod 52 may not include parallel keys 66, 66'. For example, the bare ends 65, 65' of the rod 52 may be slidable in the respective slots 63, 63'. Rather than having slots 63, 63' of different sizes, the slots 63, 63' may alternatively be the same size and different sized keys 66, 66' may be used. This arrangement conveniently allows a universal mount 57 to be used for all the interface brackets 44-48, 44'-48'. For embodiments having a rod 52 fixed at one end, that end need not be received in a slot. Instead the fixed end may be bolted or welded to the mount 57.

Figure 9:
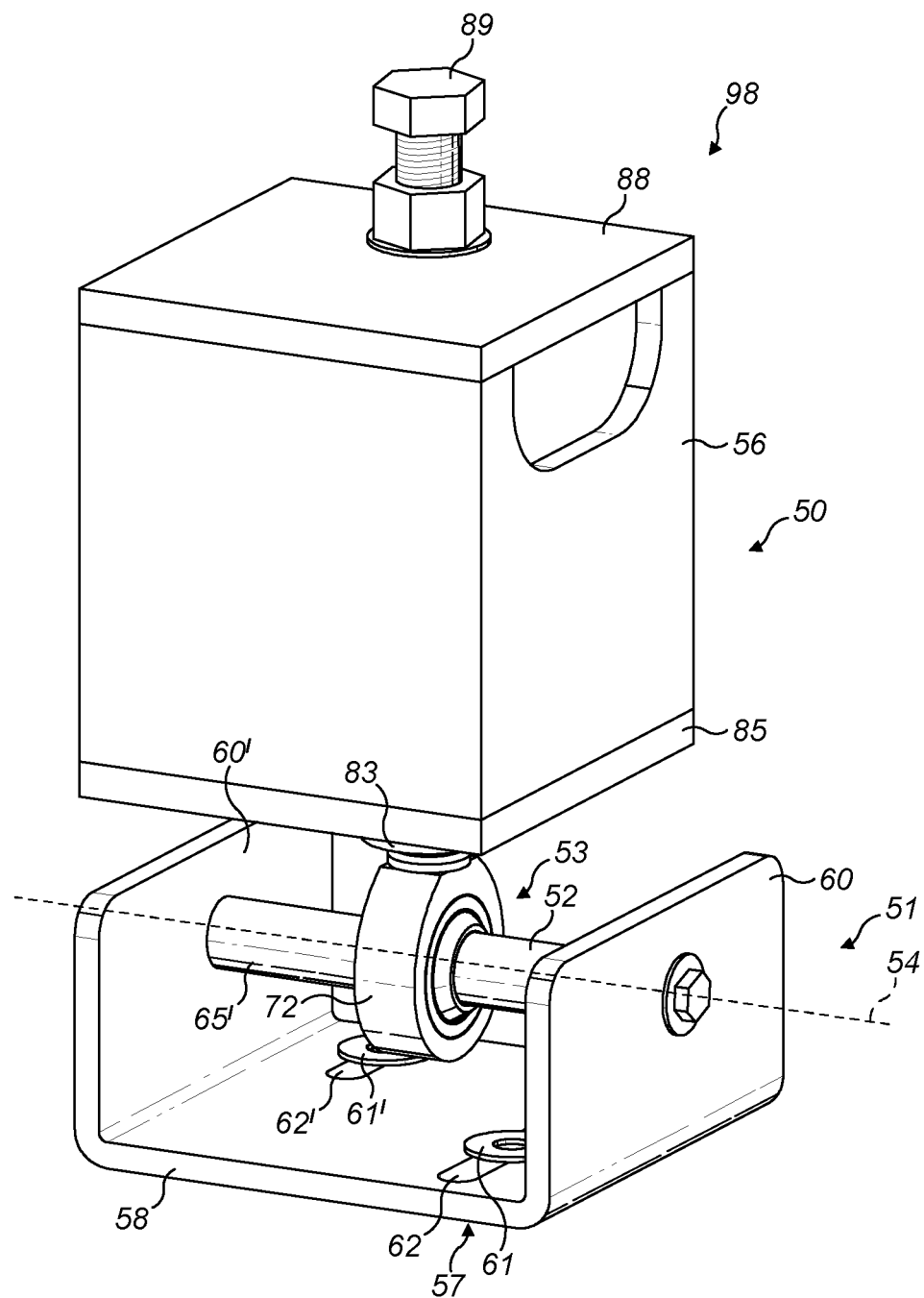
FIG. 9 is a perspective view of an interface bracket according to a second embodiment of the present invention.

FIG. 9 shows an interface bracket 98 according to a second embodiment of the invention. In this embodiment, both ends of the slide rod 52 are fixed to the mount 57. Consequently, the bracket 98 accommodates thermal expansion of the mould in the spanwise direction but not in the chordwise direction. Other features of the bracket 98 are identical to the bracket described above and so are not repeated. In practice the brackets 98 of the second embodiment may be used in combination with the brackets 44 of the first embodiment. For example, the brackets 98 may be used at certain positions of the mould assembly where chordwise expansion does not occur or to restrict chordwise expansion at those locations, whilst the brackets 44 of the first embodiment may be used at other positions of the mould assembly to permit chordwise expansion at those locations.

Figure 10:
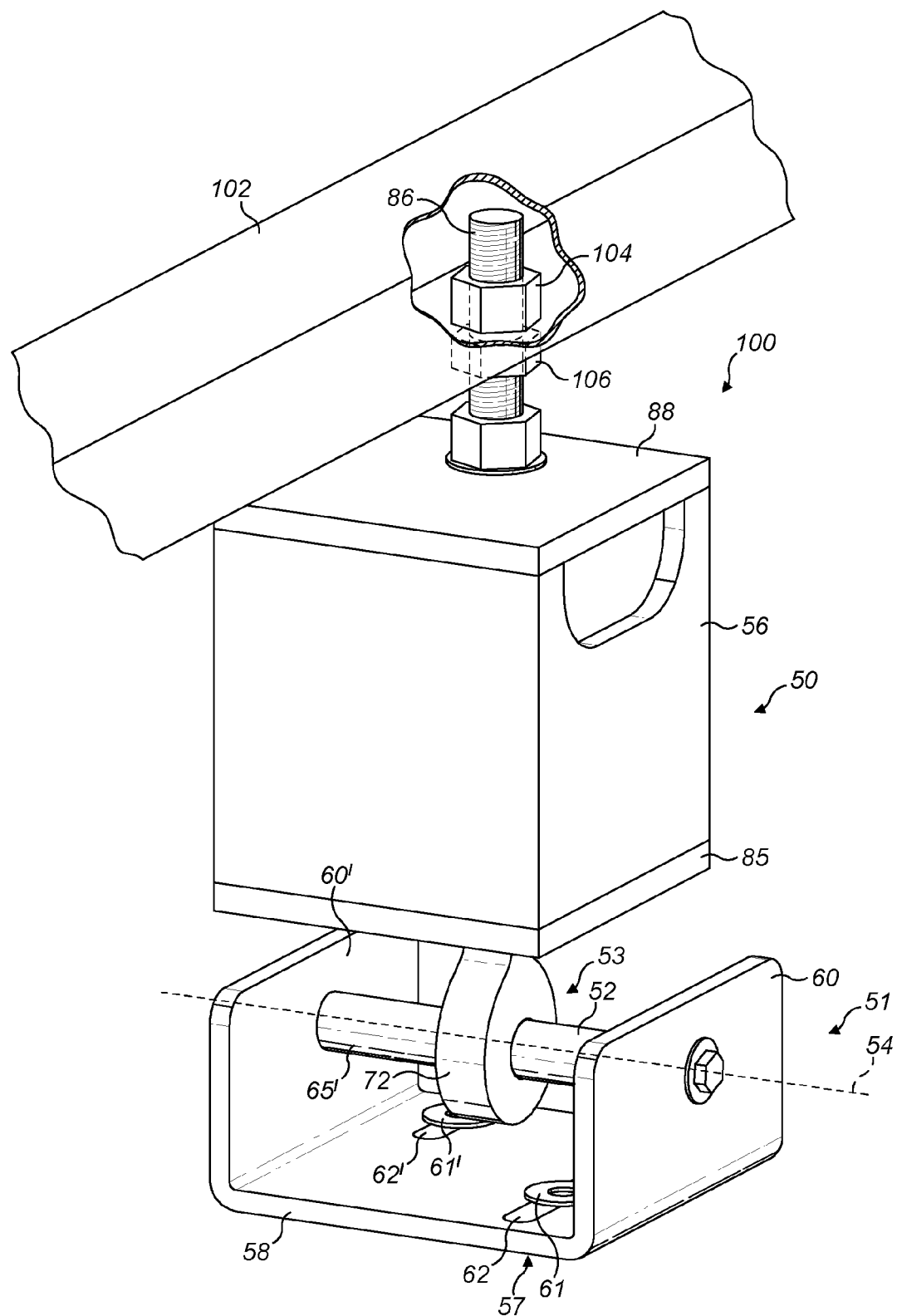
FIG. 10 shows an interface bracket according to a third embodiment of the present invention.

FIG. 10 shows an interface bracket 100 according to a third embodiment of the invention. This embodiment is similar to the second embodiment in that it only accommodates thermal expansion in the spanwise direction. However, this embodiment also omits the articulated ball joint of the first and second embodiments. Again, these brackets 100 may be used in combination with the brackets of the first and/or second embodiments.

FIG. 10 also shows the interface bracket 100 mounted to a tubular member 102 of the frame 25, 26 shown in FIG. 2. The threaded bolt 86 extends through a hole provided in the tubular member 102 and a pair of nuts 104, 106 are used to clamp the bracket 100 to the tubular member. One of the nuts 104 is provide inside the tubular member (as shown in the cutaway view), whilst the other nut 106 is provided outside the tubular member 102. The threaded bolt 86 may be turned to vary the extent to which the bolt 86 extends into the tubular member 102.

When fitting the bracket 100 to the mould and to the frame, this adjustment allows the bracket 100 to accommodate varying clearances between the mould and the frame. Furthermore, once the bracket 100 has been mounted to the mould and the frame, this adjustment can be used to vary the separation between the mould and the frame in the flapwise direction, and hence to adjust the shape of the mould as required. Whilst this flapwise adjustment has been described in relation to the third embodiment of the invention, it will be appreciated that it is equally applicable to the first and second embodiments.

Figure 11:
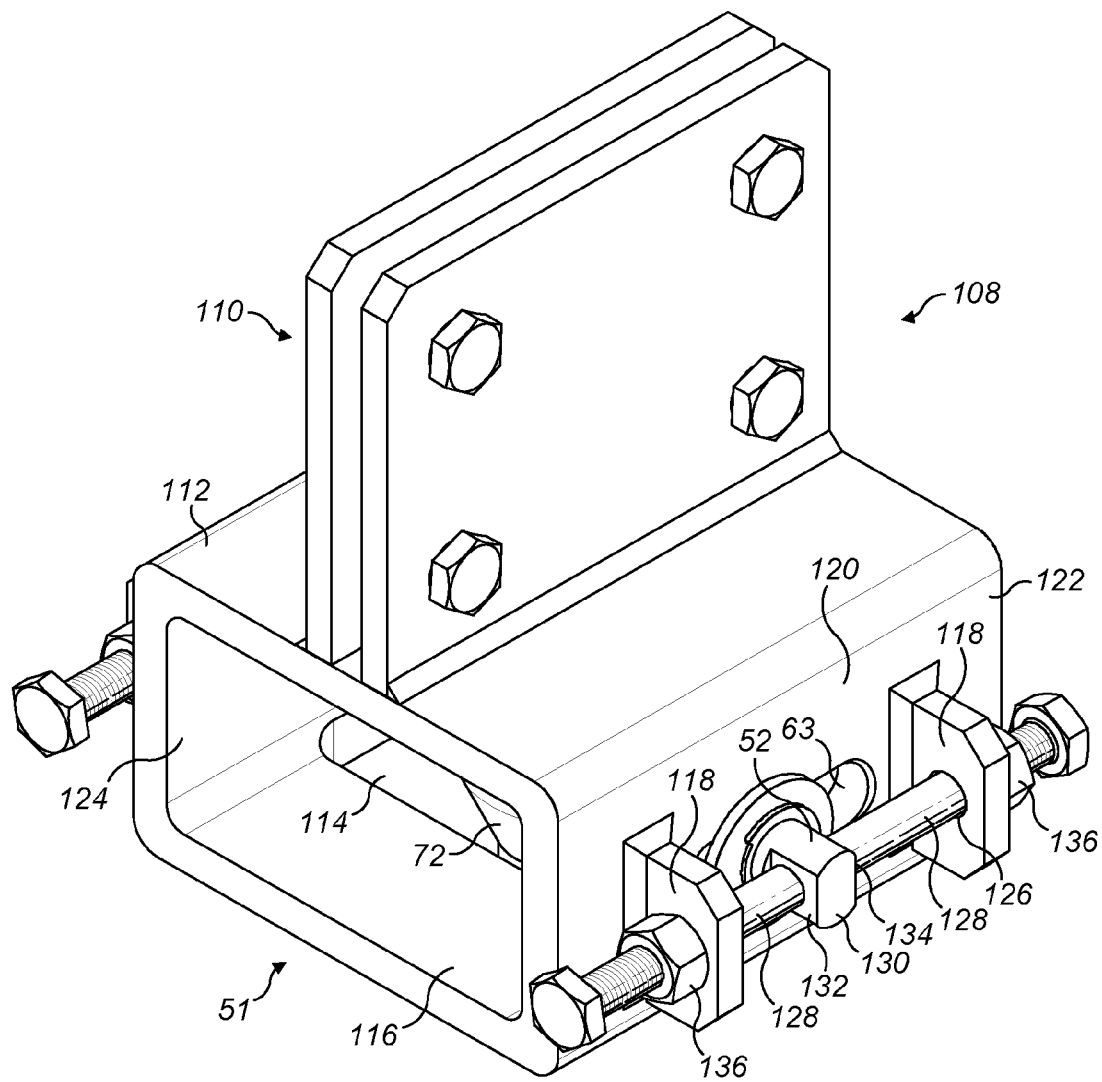
FIG. 11 shows an interface bracket according to a fourth embodiment of the present invention.

FIG. 11 shows an interface bracket 108 according to a fourth embodiment of the invention. In this embodiment, the second part 51 of the bracket 108 is generally box-shaped and includes an upstanding flange 110 on a first face 112 for mounting to the mould or frame of the mould assembly. The eyelet 72 of the first part 51 (not shown) of the bracket 108 extends through an aperture 114 in an opposed second face 116 of the bracket 108, and is slidably coupled to the slide rod 52 in substantially the same way as the brackets described above.

A pair of flanges 118 are welded to an outer surface 120 of a first side 122 of the bracket 108, respectively at either end of the slot 63. Whilst not visible in the perspective view of FIG. 11, a similar pair of flanges is welded to the opposed second side 124 of the bracket 108. The flanges 118 each include an aperture 126 through which a respective threaded bolt 128 extends parallel to the slot 63 and towards an end 130 of the slide rod 52. The end 130 of the slide rod 52 is provided with flat side surfaces 132. The bolts 128 extend coaxially on the respective sides of the slide rod 52, and the separation between the respective ends 134 of the bolts 128 delimits the extent of relative chordwise movement permitted by the bracket 108. It will be appreciated that this arrangement provides an alternative to the parallel key arrangement described in relation to the first embodiment. The amount of separation between the respective ends 134 of the bolts 128 can be adjusted by turning the bolts 128. The bolts 128 are locked in place by nuts 136, which abut the respective flanges.

As an alternative to delimiting the extent of relative chordwise movement, the bolts 128 can be used to move the mould relative to the supporting frame in the chordwise direction, and/or actively to adjust the shape of the mould in the chordwise direction. This is achieved by extending the bolts 128 such that the end 130 of the slide rod 52 is clamped between the mutually opposed bolts 128. This is the configuration shown in FIG. 11, whereby the ends 134 of the respective bolts 128 each abut a respective flat side surface 132 of the slide rod 52. In this configuration, tightening one of the bolts 128 and loosening the other bolt 128 can be used to move or otherwise adjust the mould in the chordwise direction.

Many other modifications may be made to the examples described above without departing from the scope of the invention as defined by the accompanying claims.

The invention claimed is:

1. A bracket for clamping a wind turbine blade mould to a supporting structure, the bracket comprising a first part for attaching to one of the mould or the supporting structure and a second part for attaching to the other of the mould or the supporting structure,
the first and second parts being connected together and configured to provide constrained relative movement therebetween along a first axis to accommodate thermal expansion of the mould relative to the supporting structure in a first direction parallel to the first axis;
wherein the first and second parts of the bracket are connected via an articulated joint that allows the first and second parts to pivot relative to one another without moving the first axis, such that the bracket independently accommodates misalignments between the mould and the supporting structure; and
wherein the first and second parts are configured to slide relative to one another in the first direction.

2. The bracket of claim 1, wherein the articulated joint is configured to provide relative movement between the first and second parts in three degrees of freedom.

3. The bracket of claim 2, wherein the articulated joint is a ball joint.

4. The bracket of claim 1, wherein the bracket further includes a slide rod extending along the first axis, the slide rod being fixed relative to the second part of the bracket in the first direction, and the first part of the bracket includes an eyelet that is slidably engaged with the slide rod to permit relative movement between the first and second parts of the bracket in the first direction.

5. The bracket of claim 4, wherein the eyelet is configured to pivot relative to the slide rod.

6. The bracket of claim 5, wherein the eyelet includes an outer part and an inner part, the inner part being slidably engaged with the slide rod and the outer part being configured to pivot with respect to the inner part.

7. The bracket of claim 6, wherein the inner and outer parts together define the articulated joint.

8. The bracket of claim 7, wherein the inner part is substantially spherical such that the inner and outer parts form a ball joint.

9. The bracket of claim 1, wherein the first and second parts of the bracket are further configured to provide constrained relative movement therebetween along a second axis transverse to the first axis to accommodate thermal expansion of the mould relative to the supporting structure in a second direction parallel to the second axis.

10. The bracket of claim 9, wherein the articulated joint is configured to allow the first and second parts of the bracket to pivot relative to one another without moving the second axis.

11. The bracket of claim 9, wherein the slide rod is permitted to move freely relative to the second part of the bracket in the second direction to permit relative movement between the first and second parts of the bracket in the second direction.

12. The bracket of claim 11, wherein the second part of the bracket includes an elongate slot extending in the second direction in which a first end of the slide rod is slidably received.

13. The bracket of claim 11, wherein a second end of the slide rod is fixed relative to the second part of the bracket in the second direction.

14. The bracket of claim 11, wherein the second part of the bracket includes a pair of opposed elongate slots in which first and second ends of the slide rod are respectively received, the elongate slots each extending in the second direction.

15. The bracket of claim 14, wherein an elongate member is provided at each end of the rod, the elongate members being received in the respective slots.

16. The bracket of claim 15, wherein the elongate members are of substantially the same length and the slots are of different lengths.

17. The bracket of claim 15, wherein the elongate members are of different lengths and the slots are of substantially the same length.

18. The bracket of claim 14, wherein the second part of the bracket comprises a U-shaped mount having a substantially flat base and a pair of opposed sidewalls, and wherein each slot is provided in a respective sidewall of the U-shaped mount.

19. The bracket of claim 9, wherein the bracket comprises adjustment means for moving the mould relative to the supporting structure in the second direction and/or for adjusting the shape of the mould in the second direction.

20. The bracket of claim 19, wherein the adjustment means is configured to delimit the extent of permitted relative movement between the first and second parts of the bracket in the second direction.

21. The bracket of claim 9, wherein the first and second axes are mutually perpendicular.

22. The bracket of claim 1, wherein the bracket is adjustable in a third direction substantially parallel to a flapwise direction of a wind turbine blade manufactured in the mould.

23. The bracket of claim 22, wherein the bracket is adjustable to vary the separation between the first and second parts in the third direction.

24. The bracket of claim 22, wherein the bracket is adjustable to cause the first and second parts to move together in the third direction relative to the mould and/or supporting structure.

25. A bracket for clamping a wind turbine blade mould to a supporting structure, the bracket comprising a first part for attaching to one of the mould or the supporting structure and a second part for attaching to the other of the mould or the supporting structure,
  the first and second parts being connected together and configured to provide constrained relative movement between the mould and the supporting structure to accommodate thermal expansion of the mould relative to the supporting structure in a spanwise direction and/or in a chordwise direction;
  wherein the bracket is adjustable in a generally flapwise direction substantially perpendicular to both the spanwise and chordwise directions to vary the separation between the mould and the supporting structure in the flapwise direction; and
  wherein the first and second parts are configured to slide relative to one another in the spanwise and/or chordwise direction.

26. The bracket of claim 25, wherein the first and second parts of the bracket are connected via an articulated joint that allows the first and second parts to pivot relative to one another, such that the bracket independently accommodates misalignments between the mould and the supporting structure.

27. A mould assembly comprising a mould coupled to a supporting structure by a plurality of brackets as defined in claim 1.

28. The mould assembly of claim 27, wherein the mould is for moulding part of a wind turbine rotor blade and the brackets are arranged to accommodate thermal expansion of the mould relative to the supporting structure in mutually perpendicular spanwise and chordwise directions of the mould.

29. The mould assembly of claim 28, wherein a first set of brackets are arranged respectively at intervals along a leading edge of the mould, and a second set of brackets are arranged respectively at intervals along a trailing edge of the mould, and wherein the first and second sets of brackets are configured to accommodate different extents of thermal expansion of the mould in the chordwise direction.

30. The mould assembly of claim 27, wherein the mould further includes a plurality of air ducts through which warm air is channeled to heat the moulds, and the brackets are mounted to the air ducts.

31. A wind turbine blade mould assembly comprising a mould coupled to a supporting structure by a plurality of brackets as defined in claim 1.

* * * * *